United States Patent [19]

Rabenau

[11] 3,792,605

[45] Feb. 19, 1974

[54] METHOD AND CIRCUIT FOR FLUID PRESSURE GAGING

[75] Inventor: Richard Rabenau, Tipp City, Ohio

[73] Assignee: The Bendix Corporation, Southfield, Mich.

[22] Filed: Mar. 20, 1972

[21] Appl. No.: 236,006

[52] U.S. Cl. .............................................. 73/37.9
[51] Int. Cl. ...................... G01b 13/00, G01b 13/10
[58] Field of Search ....... 73/37.9, 37.5, 4 R; 137/82

[56] References Cited
UNITED STATES PATENTS

| | | | |
|---|---|---|---|
| 3,178,931 | 4/1965 | Kirk | 73/37.9 X |
| 2,636,380 | 4/1953 | Van Dorn | 73/37.9 |
| 3,621,862 | 11/1971 | Wojtecki | 137/82 |

Primary Examiner—Richard C. Queisser
Assistant Examiner—Daniel M. Yasich
Attorney, Agent, or Firm—John R. Benefiel

[57] ABSTRACT

A back pressure gaging circuit is disclosed of the type wherein gage tooling provided with one or more fluid jets disposed to be directed at a surface of a workpiece, with variations in the distance between the gage tooling and the workpiece causing variations in the effect the workpiece has on the pressure upstream of the jet, which effect is utilized to measure this distance. In the present invention, the pressure upstream of a fixed restriction which is in turn upstream of the gage tooling is adjusted so as to maintain a constant pressure at the reading head through variations in distance to the workpiece. The variations in pressure upstream of the restriction are then utilized to measure the variations in distance to the workpiece.

2 Claims, 2 Drawing Figures

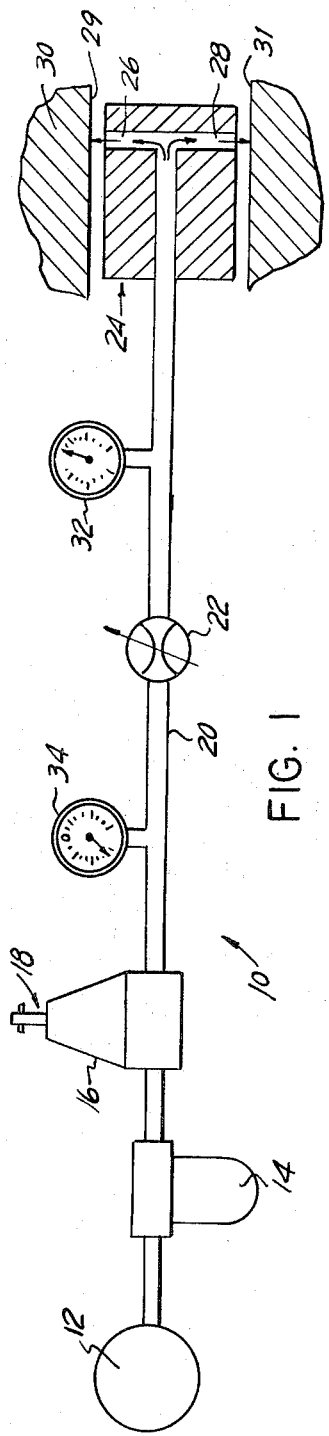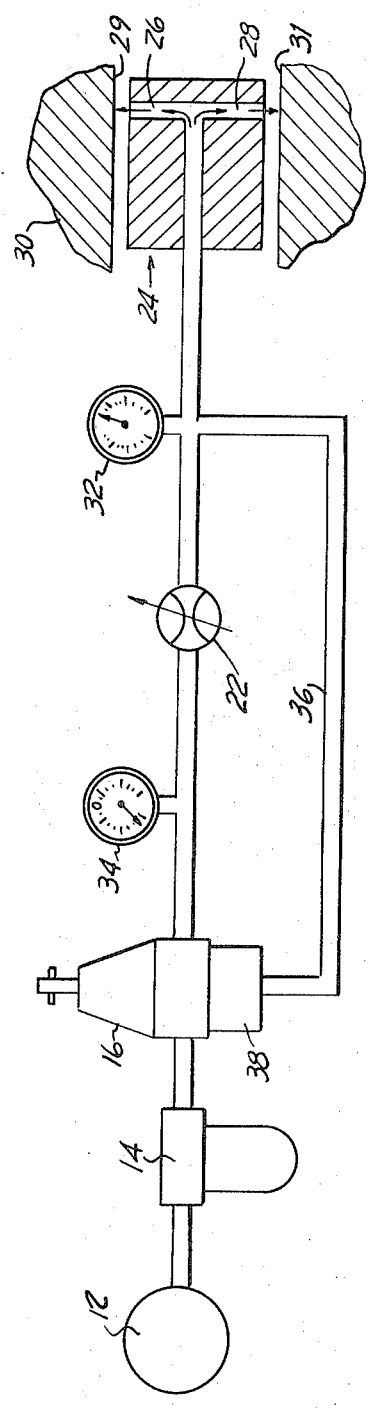

METHOD AND CIRCUIT FOR FLUID PRESSURE GAGING

BACKGROUND OF THE INVENTION

1. Field of the Invention

This invention concerns measuring devices and more particularly devices utilizing fluid pressure to measure dimensional variations in workpieces.

2. Description of the Prior Art

Back pressure gaging circuits have long been known in the art, and have usually consisted of a gage tooling equipped with an air jet supplied with fluid under regulated pressure. Changes in pressure upstream of the jet caused by variations in distance between the workpiece and the reading head are used to measure these distances and thus the dimensional variations in the workpiece.

While generally satisfactory, this arrangement does inherently have at least two significant limitations:

1. Extremely limited range. The proper interaction between the jet and the workpiece necessary to produce the correlated variations in back pressure occurs only over an extremely limited range. For example, for a jet diameter of 0.078 inches, a linear range of only 0.009 inches is obtained. This limits the usability of a given gage in some situations and also produces complications in test set up fixturing as well as other disadvantages.

2. The jet force exerted on the workpiece varies with the distance between the workpiece and the gage tooling. While this effect may be insignificant when the circuit is used with rigid workpieces and fixturing, in gaging very flexible workpieces this variation in gaging force could produce significant errors.

Therefore, it is an object of the present invention to provide a back pressure gaging circuit which has a greater linear range than conventional back pressure gaging circuits and which exerts a constant gaging force on the workpiece.

SUMMARY OF THE INVENTION

This object and others which will become apparent upon a reading of the following specification and claims is accomplished by an arrangement wherein the pressure just upstream of the gage tooling is maintained constant either by manual adjustment or a pressure responsive feedback loop and the extent of this adjustment necessary to maintain the pressure constant is measured to indicate the variations in distance to be gaged. In the preferred embodiment, this measurement is made by providing a flow restriction upstream and the resulting variation in pressure upstream of the fixed restriction located upstream of the gage tooling is utilized for measuring these variations in distance to the workpiece.

DESCRIPTION OF THE DRAWINGS

FIG. 1 is a schematic representation of the back pressure circuit of the present invention.

FIG. 2 is a schematic representation of a second embodiment of the back pressure measuring circuit according to the present invention.

DETAILED DESCRIPTION

In the following detailed description, specific embodiments will be described and certain terminology will be utilized for the sake of clarity, but it is to be understood that these are merely illustrative and the invention may be practiced in a variety of forms and embodiments.

Referring to the drawings, and particularly FIG. 1, a back pressure circuit 10 is depicted schematically.

This circuit includes a source 12 of fluid supplied under a constant pressure (such as air), which is cleaned by being passed through a conventional filter 14 before being communicated to a regulator 16 which includes manual means 18 for adjusting the pressure downstream therefrom.

The fluid under pressure is communicated via passage means 20 and restriction 22 to gage tooling 24 which includes openings 26 and 28 each adapted to direct a jet of the fluid at surfaces 29 and 31 of the workpiece 30.

The restriction 22 is adjusted to produce a given pressure drop thereacross so that the pressure upstream therefrom is always different from that downstream as long as flow is occurring from the openings 26 and 28.

A pressure gage 32 adapted to indicate the pressure downstream of the restriction while a pressure gage 34 is provided adapted to respond to the pressure upstream therefrom.

In use, for each reading the operator adjusts the regulator 16 so that the pressure downstream of the restriction 22 (read by gage 32) remains a constant. This adjustment in turn causes a variation in the pressure upstream of the restriction 22, which variation in turn is correlated to the distance between the gage tooling 24 and the workpiece 30 since this distance controls the pressure to be held constant as read by gage 32. Thus, the state of adjustment of the adjustment means constituted by the regulator 16 corresponds to the distance between the openings 26 and 28 and the surfaces 29 and 31.

For these purposes i.e., to measure this state of adjustment the gage 34 may be calibrated to read directly in inches or some other unit of measurement so as to provide an indicating means for indicating the corresponding distance variations from the gage tooling openings 26 and 28 to the workpiece surfaces 29 and 31 in response to the adjustments of the regulator 16.

It can be appreciated that since the pressure is increased at openings 26 and 28 as the workpiece surface gaged gets further from the gage tooling 24 in order to compensate for the reduced restrictive effect on the fluid jets, the jet force on the workpiece tends to be maintained at a constant level.

Similarly, for this same reason the range of such distances in which the required correlation between the workpiece position and the back pressure created thereby has been found to be increased, since the increased pressure tends to create the same jet forces as exist with the surface closer.

The same is true for both of these effects with lessened distances. Therefore, it can be seen that both of the desired improvements described above are accomplished by this invention.

In order to eliminate the necessity for manual adjustments for each reading, a feedback loop may be provided as depicted schematically in FIG. 2.

In this embodiment all of the elements are the same as in FIG. 1, but the pressure downstream of the restriction is communicated via passage 36 to means 38 responsive to downstream pressure, which is adapted to operate the regulator 16 so as to maintain a constant pressure at this point.

Thus no manual adjustments are necessary to obtain a reading.

Many variations are of course possible within the scope of the invention as for example, other means for indicating the extent of adjustment necessary to maintain a constant pressure may be utilized such as a mechanical calibration of the adjustment means 18.

What is claimed is:

1. A fluid pressure gaging circuit for gaging workpieces comprising:

gage tooling including at least one opening formed in said gage tooling and directed at a surface of a workpiece;

means for supplying fluid under pressure to said at least one gage tooling opening including passage means in communication with said gage tooling opening said passage means having an intermediate restriction formed therein to produce a pressure drop thereacross;

adjustment means for adjusting the fluid pressure at said gage tooling opening including regulator means upstream of said intermediate restriction and also including means for sensing said fluid pressure downstream from said restriction and to enable the fluid pressure at said gage tooling opening to be adjusted to predetermined constant value through variations in the distance from said gage tooling opening to said workpiece surface indicating means for indicating the corresponding distances from said gage tooling opening to said workpiece surface in response to the state of adjustment of said adjustment means, when said downsteam pressure is adjusted to said predetermined constant value to obtain a measurement reading which includes means sensing the fluid pressure in said passage means upstream of said restriction.

2. The circuit of claim 1 wherein said means for sensing fluid pressure upstream from said restriction includes a pressure gage sensing said upstream pressure and calibrated to indicate units of measurement corresponding to said upstream pressure when said fluid pressure at said gage tooling opening is adjusted to a constant value.

* * * * *